United States Patent [19]

Fogelberg

[11] Patent Number: 4,718,303
[45] Date of Patent: Jan. 12, 1988

[54] FOUR WHEEL DRIVE TRANSFER CASE WITH CLUTCH MECHANISM

[75] Inventor: Mark J. Fogelberg, Muncie, Ind.

[73] Assignee: Borg-Warner Automotive, Inc., Troy, Mich.

[21] Appl. No.: 915,454

[22] Filed: Oct. 6, 1986

[51] Int. Cl.⁴ .................. F16H 1/44; F16H 37/06
[52] U.S. Cl. .................. 74/710.5; 74/665 GE; 180/249
[58] Field of Search ......... 74/711, 710.5, 665 GA, 74/665 GE; 180/247, 248, 249, 250

[56] References Cited

U.S. PATENT DOCUMENTS

| | | | |
|---|---|---|---|
| 2,649,941 | 8/1953 | Doebeli | 192/35 |
| 2,796,941 | 6/1957 | Hill | 180/44 |
| 2,870,654 | 1/1959 | Trudeau | 74/777 |
| 3,125,202 | 3/1964 | Hill | 192/47 |
| 3,282,611 | 11/1966 | Weismann et al. | 74/650 |
| 3,433,319 | 3/1969 | McLean | 180/44 |
| 3,450,238 | 6/1969 | Adkins | 192/21.5 |
| 3,492,890 | 2/1970 | Hill et al. | 74/714 |
| 3,517,573 | 6/1970 | Roper | 74/711 |
| 3,584,713 | 6/1971 | Tani et al. | 192/38 |
| 3,605,964 | 9/1971 | Jonsson et al. | 192/40 |
| 3,627,072 | 12/1971 | Smirl | 180/44 |
| 3,656,573 | 4/1972 | Halberg | 180/44 |
| 3,748,928 | 7/1973 | Shiber | 74/711 |
| 3,773,130 | 11/1973 | Mueller | 180/24.09 |
| 3,830,116 | 8/1974 | Fisher | 74/711 |
| 3,869,013 | 3/1975 | Pagdin et al. | 180/44 |
| 3,869,940 | 3/1975 | Webb et al. | 74/711 |
| 3,893,535 | 7/1975 | Burckhardt | 180/82 |
| 3,923,113 | 12/1975 | Pagdin | 180/44 |
| 3,941,199 | 3/1976 | Williams | 180/44 |
| 3,967,862 | 7/1976 | Hunter et al. | 308/21 |
| 4,018,317 | 4/1977 | Lemon | 192/36 |
| 4,054,065 | 10/1977 | Lemon | 74/711 |
| 4,065,234 | 12/1977 | Yoshiyuki et al. | 417/420 |
| 4,086,563 | 4/1978 | Bachman | 340/52 |
| 4,103,753 | 8/1978 | Holdeman | 180/49 |
| 4,154,487 | 5/1979 | Vannini et al. | 303/106 |
| 4,236,594 | 12/1980 | Ramsperger | 180/167 |
| 4,239,092 | 12/1980 | Janson | 188/267 |
| 4,263,824 | 4/1981 | Mueller | 74/711 |
| 4,298,085 | 11/1981 | Moroto et al. | 180/247 |
| 4,312,249 | 1/1982 | Horn et al. | 74/866 |
| 4,344,139 | 8/1982 | Miller et al. | 134/426 |
| 4,349,233 | 9/1982 | Bullard et al. | 303/96 |
| 4,361,871 | 11/1982 | Miller et al. | 364/426 |
| 4,417,641 | 11/1983 | Kageyama | 180/247 |
| 4,428,452 | 1/1984 | Muraoka et al. | 180/249 |
| 4,444,073 | 4/1984 | Muroto et al. | 74/665 |
| 4,444,286 | 4/1984 | Hawkins et al. | 180/197 |
| 4,445,400 | 5/1984 | Sullivan et al. | 74/711 |
| 4,452,100 | 6/1984 | Sullivan et al. | 74/711 |
| 4,456,108 | 6/1984 | Kageyama | 192/4 |
| 4,484,643 | 11/1984 | Horikoshi et al. | 180/233 |
| 4,484,653 | 11/1984 | Horikoshi et al. | 180/233 |
| 4,484,654 | 11/1984 | Hayakawa | 180/247 |
| 4,493,387 | 1/1985 | Lake et al. | 180/248 |

(LIST CONTINUED ON NEXT PAGE.)

FOREIGN PATENT DOCUMENTS

| 459638 | 3/1926 | Fed. Rep. of Germany | 74/710.5 |
|---|---|---|---|
| 0709411 | 1/1980 | U.S.S.R. | 74/711 |

OTHER PUBLICATIONS

"Gear Handbook", Darle Dudley, editor, McGraw Hill, 1st ed.–©1962.

Primary Examiner—Dirk Wright
Attorney, Agent, or Firm—John W. Harbst

[57] ABSTRACT

A four wheel drive transfer case having a three element planetary gear differential connected to the output shaft of a transmission and having two output shafts which are driven by the differential in a manner such that rotary motion of any one shaft effects rotary motion of the other shafts in a predetermined timed relationship.

U.S. PATENT DOCUMENTS

| | | | |
|---|---|---|---|
| 4,511,014 | 4/1985 | Makita | 180/233 |
| 4,521,856 | 6/1985 | Phelps et al. | 364/426 |
| 4,540,381 | 9/1985 | Molloy | 464/29 |
| 4,541,503 | 9/1985 | Akutagawa et al. | 180/249 |
| 4,545,470 | 10/1985 | Grimm | 192/56 |
| 4,552,241 | 11/1985 | Suzuki | 180/249 |
| 4,554,990 | 11/1985 | Kamiya et al. | 180/197 |
| 4,558,414 | 12/1985 | Sakakiyama | 180/233 X |
| 4,562,541 | 12/1985 | Sakakiyama | 364/424.1 |
| 4,562,542 | 12/1985 | Skarvada | 364/426 |
| 4,566,554 | 1/1986 | Suzuki | 180/249 |
| 4,566,574 | 1/1986 | Marshall | 192/84 |
| 4,583,611 | 4/1986 | Frank | 180/197 |
| 4,609,064 | 9/1986 | Suzuki et al. | 180/233 |

The transfer case further includes an electromagnetically actuated friction clutch assembly including a ball ramp mechanism and having frictionally engageable members for operably interconnecting two of the planetary gear components in a manner such that relative rotation between the two output shafts is modulated by a torque level established between the frictionally engageable members of the clutch.

32 Claims, 4 Drawing Figures

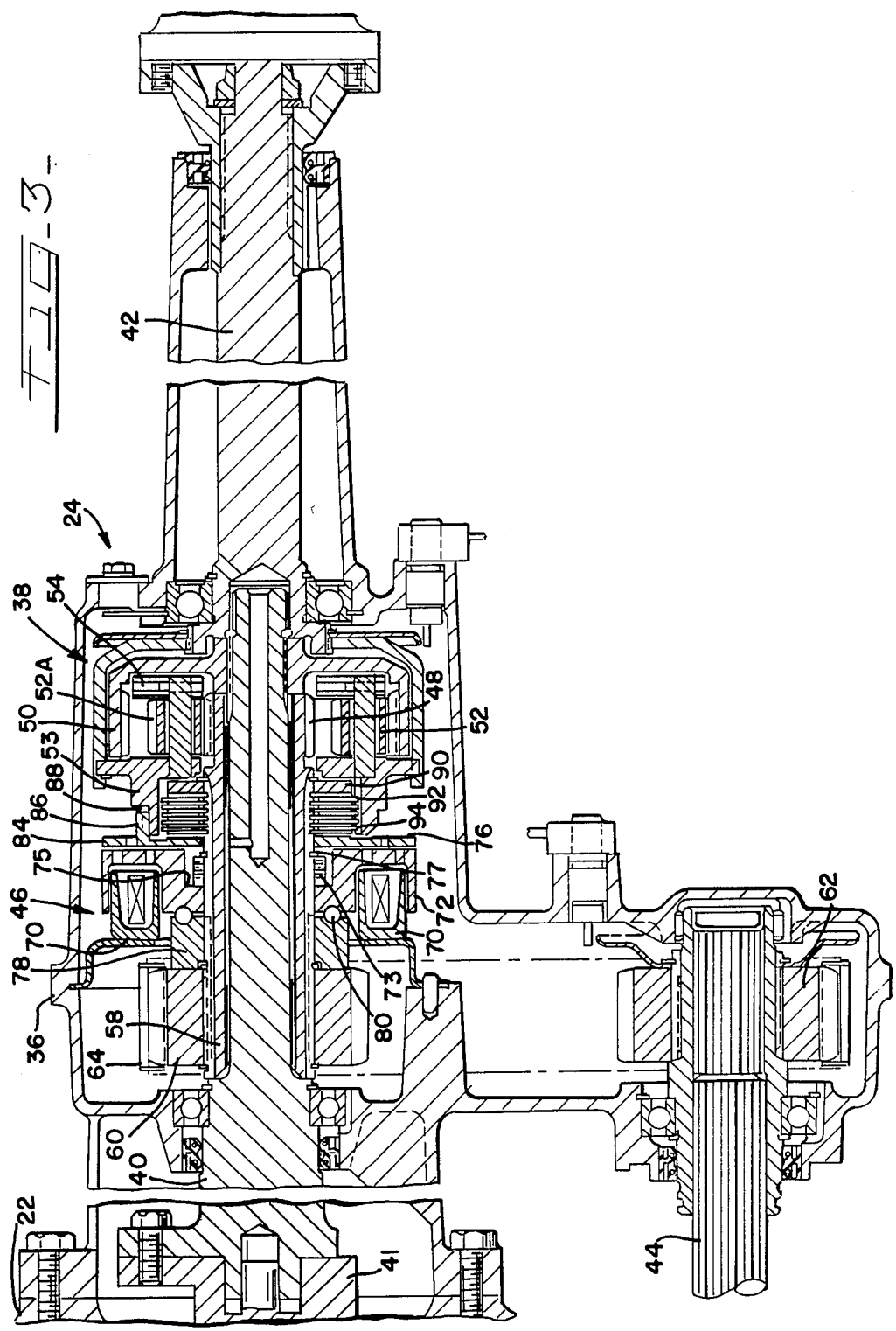

FOUR WHEEL DRIVE TRANSFER CASE WITH CLUTCH MECHANISM

FIELD OF THE INVENTION

This invention relates to a power transfer mechanism adapted for use with a four wheel drive vehicle. More particularly, the present invention relates to a torque transfer case adapted to receive torque from a prime mover and divide same to the front and rear drive axles of the vehicle.

BACKGROUND OF THE INVENTION

Four wheel drive vehicles having a transfer case in the driveline for distributing power to the front and rear drive axles are known in the art. In some applications, a bevel gear differential which evenly splits the drive torque between the drive axles is used in the transfer case to drive the front and rear axles at all times, yet allow relative rotation between the axles to accommodate steering geometry. The use of a gear differential in a drive train has one serious drawback. That is, if any wheel of the vehicle is on a low traction surface, the various axle and transfer case differentials allow that wheel to turn freely, and little power or torque is delivered to the remaining wheels.

To minimize wheel slippage, the transfer case differential is usually equipped with a manually operated lock-up mechanism. Such a mechanism is operated in either a locked or unlocked condition. When locked, the mechanism connects the front and rear drive shafts together and positively drives them both. Such a locking mechanism does not allow any differentiation between front and rear drive axle turning speeds. In the event of wheel spin, however, a simple lock up device can cause the previously gripping set of wheels to lose traction.

Several systems have been devicsed to shift a vehicle from two wheel drive to four wheel drive in response to wheel slip conditions. Such systems do not include a center differential or employ the concept of full time four wheel drive. Similarly, there are known systems which shift a four wheel drive vehicle to two wheel drive in response to a steering sensor. Again, such a system does not afford the benefits of full time four wheel drive. U.S. Pat. Nos. 4,484,653; 4,417,641; and 4,558,414 illustrate and describe examples of such systems.

Thus, there remains a need for a transfer case which can deliver full-time four wheel drive but which can respond to changing vehicle conditions. None of the previous attempts offer this unique combination of benefits.

SUMMARY OF THE INVENTION

Responding to industry needs, the present invention basically provides a transfer case incorporating a center differential which provides full-time four wheel drive. A biasing clutch is included within the transfer case to modulate the torque delivered to the front and rear drive axles. The modulatable biasing clutch allows the transfer case to easily and readily adapt to changing vehicle conditions without detraction from its four wheel drive capabilities.

More specifically, the transfer case of the present invention includes a differential comprised of a planetary gear set having a sun gear, ring gear and a plurality of intermeshing planetary or pinion gears carried by a pinion carrier. The transfer case also includes first and second power output shafts. Each of the output shafts is connected to one of the three planetary gear components or elements. The third element of the planetary gear set is connected to the power source. By such construction, turning or rotary movement of any one shaft causes the other two to turn in a predetermined ratio. The normal torque delivered to the output shafts will be of a fixed proportion determined by the gear geometry. A friction clutch assembly, operably disposed between the output shafts, is provided to partially bias the differential. The addition or application of a biasing clutch operably disposed between front and rear drive output shafts can drastically alter the torque distribution therebetween depending on the the degree of clutch application, input torque and anything that tends to vary the relative front to rear rotation ratio.

In its presently preferred form, the clutch assembly includes an electromagnetic clutch having frictionally engagable members for operably and conditionally interconnecting two of the differential components such that the relative rotation between the output shafts is modulated by a torque level established between the friction engagable members of the clutch. In operation, the biasing clutch adds driving torque to the slowest turning output shaft and subtracts torque from the fastest turning output shaft in an amount equal to the torque capacity of the clutch. The clutch is designed with a ball ramp mechanism which adds a servo-action to the clutch actuator member. The clutch actuator member serves to axially compress the friction engaging members to generate frictional contact therebetween and create a clutch torque whose magnitude is controlled as a function of the clutch current provided to the electromagnetic clutch. The degree of clutch torque capacity may be modulated from completely free to that equivalent to dry payment wheel skid torque. The degree of clutch torque may be preselected such that the vehicle's performance characteristics may be altered according to the driver's wishes. Alternatively, an automatic control system responsive to wheel slip may be used to control the torque bias.

The ability to control or modulate the torque level of the biasing clutch sets the present invention apart from those systems which arbitrarily lock the differential to create four wheel drive. The ability to bias torque to a particular or desired level improves traction control and opens up a new area of programmable vehicle handling characteristics. As discussed above, in the event of wheel spin a simple lock up device can cause the previously gripping set of wheels to lose traction. In contrast, the modulatable biasing clutch offered for the first time by the present invention can control torque transfer whereby traction is maintained at the gripping wheels while the slipping wheels are gradually brought under control. The net result is improved traction.

Accordingly, a primary object of the present invention is to provide an improved torque transfer mechanism for a four wheel drive vehicle which has the ability to bias torque between front and rear drive wheels while concurrently providing a driving force to each of said wheels.

Another object of this invention is to provide a four wheel drive transfer case having an input shaft, two output shafts, and means energizable to bias torque to said output shafts across a planetary gear differential mechanism.

Still a further object of this invention is the provision of a four wheel drive transfer case having an input shaft and two output shafts all of which are connected through a planetary gear differential, such that rotary motion of any one shaft effects rotation of the others, and electromagnetic clutch means for biasing torque to said output shafts across a planetary gear differential mechanism.

BRIEF DESCRIPTION OF THE DRAWINGS

Having in mind the above objects and other attendant advantages that would be evident from an understanding of this disclosure, the invention comprises the devices, combination and arrangement of parts as illustrated in the presently preferred form of the invention which is hereinafter set forth in detail to enable those skilled in the art to readily understand the function, operation, construction and advantages of same when read in conjunction with the accompanying drawings in which:

FIG. 3 is a cross-sectional view showing one example of the four wheel drive transfer case of this invention.

DETAILED DESCRIPTION OF A PREFERRED EMBODIMENT

Figure 1:
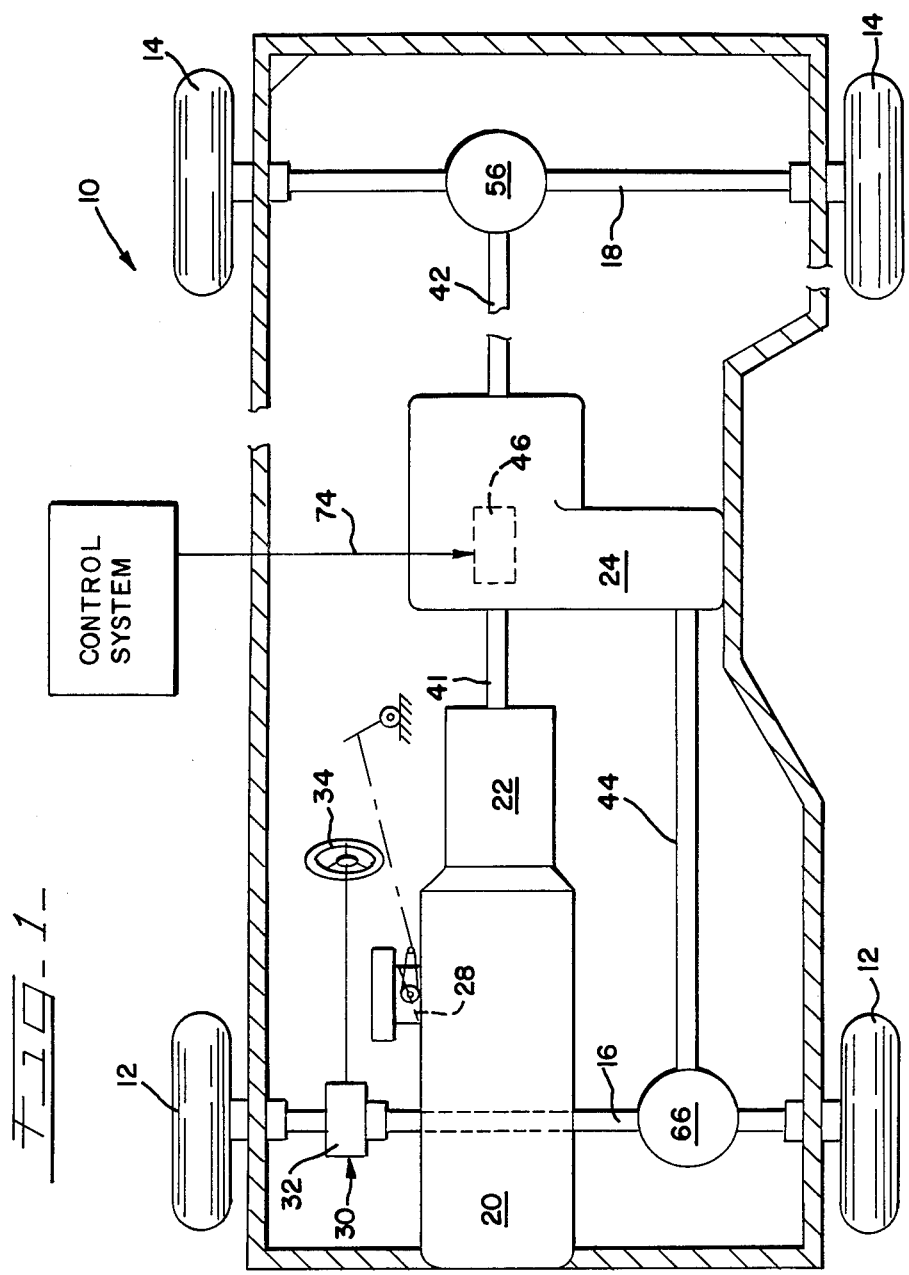
FIG. 1 is a schematic showing of an automobile to which the four wheel drive transfer case of this invention is applied.

Referring now to the drawings, wherein like reference numerals indicate like parts throughout the several views, in FIG. 1 there is schematically illustrated a 4-wheel drive vehicle 10 having front and rear pairs of road wheels 12 and 14, respectively. The road wheels 12 and 14 are mounted on front and rear drive axle means 16 and 18, respectively. The vehicle 10 is further provided with a power train assembly including a power source or engine 20 whose output is transmitted to each drive axle means through a transmission 22 and a drive transfer unit 24 having a center or interaxle differential unit. The engine 20 is provided with a carburator 26 having a spindle mounted valve 28 for regulating the air intake to the induction passage of the carburator wherein an intake manifold vacuum develops. The vehicle may further include steering mechanism means 30. The steering mechanism means 30 includes a steering box 32 operatively connected to a steering wheel 34. With the exception of the transfer case, the purpose and operation of the other parts of the vehicle are well-known and, thus, no further details need be provided therefore.

Figure 2:
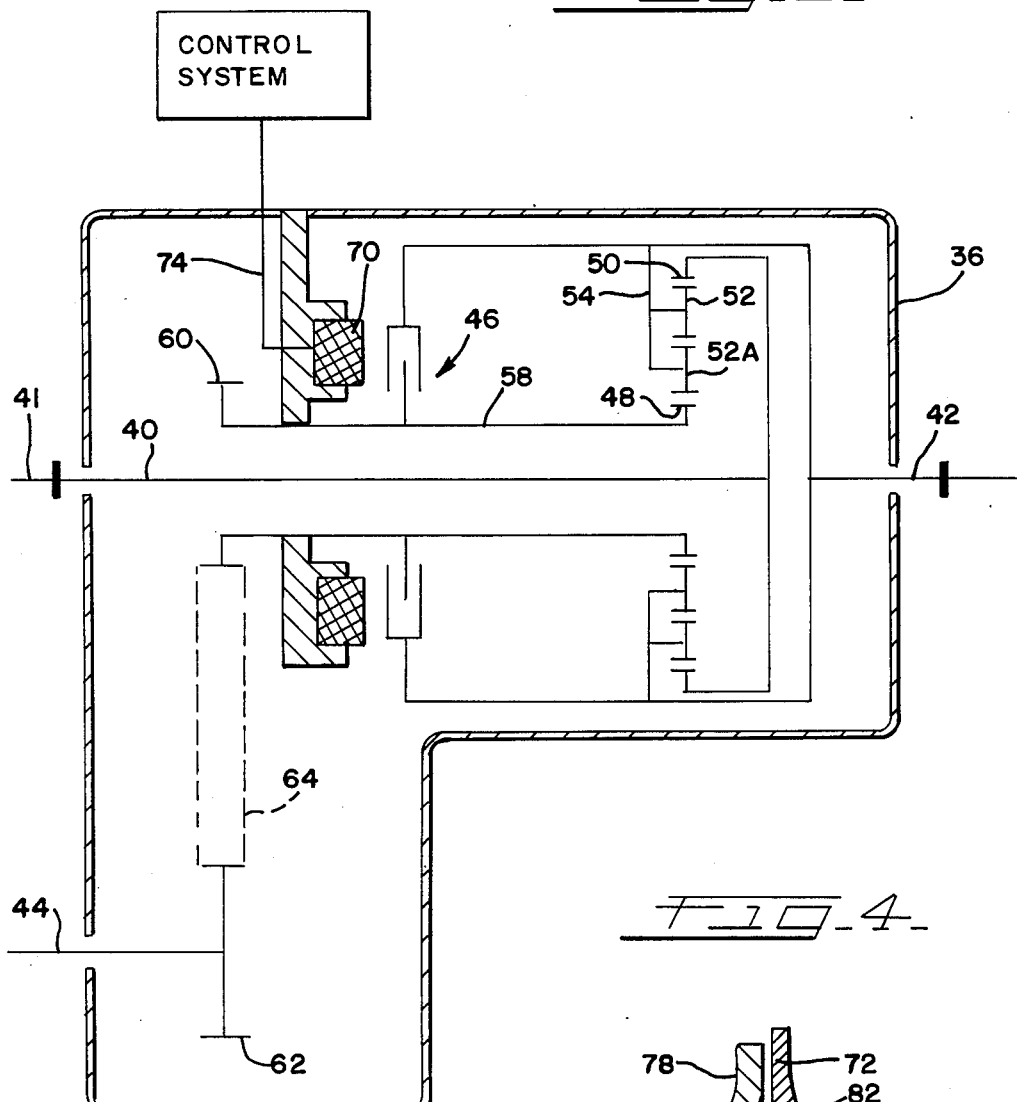
FIG. 2 is a diagrammatic view of the transfer case of this invention.

As schematically illustrated in FIGS. 2 and 3, the components of the drive transfer unit 24 are housed in a separate casing or housing 36 and comprise, generally, a center differential gear set 38, a rotatably mounted input drive shaft 40 which is connectable to the output shaft 41 extending from the transmission, two rotary mounted power output shafts 42 and 44, and operative means 46 in the form of an electromagnetic clutch assembly. In the preferred embodiment, the center differential unit 38 includes a planetary gear set. For purposes of this disclosure, however, the terms, "differential" and "differential unit" mean a mechanical connection which divides torque between the front and rear wheels at a ratio determined by a selected gear arrangement.

The presently preferred planetary gear set 38 includes three sets of nested and relatively rotatable elements; namely, an externally toothed sun gear 48, an internally toothed annulus or ring gear 50, twin pinion gears 52 and 52A which intermesh with one another and with the sun and ring gears 48 and 50 respectively. The pinion gears 52 and 52A are carried by a planet carrier 54. Depending on the torque transfer desired, any one of the three sets of elements may be connected to the power input shaft 40. In the preferred embodiment, the sun gear 48 rotates about an axis of rotation thereof and is operably connected to drive output shaft 44. The ring gear 50 is rotatable about an axis of rotation substantially coaxial with the axis of rotation of the sun gear 48 and is operably connected to the input drive shaft 40. The planet carrier 54 of the differential turns about the axis of rotation of the sun gear and is operably connected to one end of the drive output shaft 42. By this construction, rotary motion of any one shaft normally effects rotary motion of the other two shafts in a predetermined ratio.

Drive output shaft 42 is coaxially mounted in the casing relative to the input shaft 40. As illustrated in FIG. 1, the other end of the rotary power output shaft 42 is connected to a rear differential unit 56. The rear differential unit 56 is connected to and drives the rear wheels 14 thru the rear drive axle means 18. The rear differential unit 56 allows or permits the rear wheels to rotate at different speeds and absorbs rotational speed differences between the wheels.

Returning to FIGS. 2 and 3 in the illustrated embodiment, the sun gear 48 of the differential unit 38 is arranged on one end of a tubular sleeve shaft 58 which is telescopically mounted for rotation about the input drive shaft 40. Also carried on the sleeve shaft 58 is a first chain wheel 60. The first chain wheel 60 is connected with a second chain wheel 62 by suitable force transfer or chain means 64. The second chain wheel 62 is carried by the other power output shaft 44 of the differential unit. The second power output shaft 44 is spaced laterally from and extends parallel to the output shaft 42 and is rotatably supported in the casing or housing 36. As best illustrated in FIG. 1, the second output shaft 44 is connected to a front differential unit 66. The front differential unit 66 being operably connected to drive the front wheels 12 through the front drive axle means 16. The front differential unit 66 permits or allows the front wheels to rotate at different speeds and absorbs the rotational speed difference between the wheels.

Figure 4:
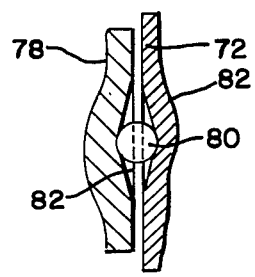
FIG. 4 is an enlarged sectional view of the ball ramp mechanism associated with the clutch assembly of this invention.

As mentioned above, the transfer unit further includes a biasing clutch assembly 46 for modulating torque transfer through the center differential. That is, the biasing clutch assembly conditionally and operationally adds or subtracts torque delivered to the drive output shafts. In the preferred embodiment, and as illustrated in FIG. 3, the electromagnetic clutch assembly 46 is comprised of stationary magnetic coil means 70 suitably arranged within the housing 36 and which is partially surrounded by a soft iron rotor 72. As will be subsequently described, suitable electrical conduits or lines 74 provide clutch current to the magnetic coil 70 to generate a magnetic flux. On one side, the rotor 72 is formed with a suitably slotted end face 76. A connecting sleeve or member 78 connected to shaft 58 is provided adjacent the opposite side of the rotor 72. As best illustrated in FIG. 4, the rotor 72 is coupled to the shaft 58 through a ball ramp coupling including a series of loosely movable locking balls 80 which are entrapped within a series of pockets defined by conically shaped recesses or ramps 82 (FIG. 4) provided on both the rotor 72 and the connecting sleeve 78. An important design aspect of this device is that the geometry of the ball/ramp design of the coupling mechanism is such that the clutch assembly is not self locking. This is necessary to ensure that the clutch will not self engage without application of an additional control input and ensures positive release or modulation capability upon removal or decreased control input.

One or more resilient springs 73 are provided to urge the rotor axially toward the connecting member or sleeve 78. Such springs are positioned between a radial surface 75 on the rotor 72 and a snap ring 77 on shaft 58. By this construction, the rotor 72 is automatically positioned to exert substantially no compressive force on the friction clutch when the electromagnet coil 70 is deenergized.

Returning to FIG. 3, the clutch assembly 46 further includes a suitably slotted armature or friction disc 84. The disc may be provided with recesses or teeth 86 which cooperate in a driving relationship with complementary recesses or teeth 88 provided on an extension 53 of the planet or pinion carrier 52. The disc 84 is capable of axial displacement relative to the shaft 58 and is arranged for friction engagement with the slotted end face 76 of the rotor 72. Axially spaced from the friction disc 84 and connected to the shaft 58 is an annular backing or pressure plate 90. Disposed between the backing plate 90 and the friction disc 84 is a set of mutually interleaved friction plates or discs 92 and 94 respectively associated with the extension 53 and the sleeve shaft 58.

In operation, the magnetic coil means 70 may be initially deenergized and no direct driving connection exists between the output shafts 42 and 44. As such, the torque split to each of the drive axles is determined by the gear geometry of the planetary gear set. Application of clutch current to the stationary coil means 70 generates a magnetic flux which causes the friction disc or armature 84 to be drawn toward the end face 76 of the rotor 72, thereby establishing a frictional driving connection between the rotor 72 and friction disc 84. Because friction disc 84 is operatively connected to the output shaft 42, it will turn at the same rotational speed thereof. Similarly, because the rotor 72 is operatively connected to output shaft 44, through the chain drive and shaft 58, it will turn at the same rotational speed as the output shaft 44. If relative motion exists between the power output shafts 42 and 44, such motion will cause the balls 80 to roll up on the conically shaped recesses 82. As such, the coupling mechanism will forceably and axially move the rotor 72 and friction disc 84, as an assembly, in a manner thereby pressing the friction plates 92 and 94 together with a compression force or wedge action. When pressed together, the friction plates 92 and 94 serve to transmit motive force between the output shafts 42 and 44. As such, the clutch will add torque to the slower turning of the two output shafts and subtract torque from the faster turning or running output shaft. By modulating the clutch current, the relative rotation of the output shafts 42 and 44 may be modulated. That is, with the coupling mechanism being designed to disengage under torque, there must be an additional torque supplied to the preliminary coupling to generate the required axial force for holding the friction plates 92 and 94 in engagement. This torque is supplied by the magnetic clutch assembly 46.

The level of clutch current supplied to the magnetic coil means 70 of the clutch assembly controls the bias torque of the clutch assembly. That is, precise control over the torque bias can be achieved by increasing or decreasing the clutch current to coil means 70 over conduit 74 in response to various parameters. If desired, a predetermined level of clutch current could be continuously provided to the magnetic coil means 70. Thus, a consistent torque bias would be applied by the clutch assembly. Alternatively, the clutch assembly could respond to relative wheel slip. Details of a control system for controlling torque bias in response to relative wheel slip are disclosed in U.S. application Ser. No. 006,207 filed Jan. 23, 1987 and to the same assignee as this application; the full text of which is incorporated herein by reference.

From the above it will be understood that this invention provides a center differential which modulates torque transfer to the front and rear wheel drive output shafts of a vehicle through energization of a unique biasing clutch. With the present invention, all four wheels of which may continually receive motive force while concurrently controlling the torque level of each wheel.

Thus, there has been provided a four wheel drive transfer case which fully satisfies the objects, aims and advantages set forth above. While the invention has been described in connection with a specific embodiment thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

Thus, having adequately described my invention, what I claim is:

1. A transfer case for a full-time four wheel drive vehicle, comprising:
   a planetary gear arrangement connectable to an output shaft of a transmission, said gear arrangement including at least three nested gear components for operably interconnecting said output shaft with both a front and a rear wheel drive output shaft for full time drive to both output shafts such that input torque to the transfer case is normally biased to both output shafts in a predetermined ratio; and
   electromagnetically actuatable friction clutch means having ball ramp mechanism means and frictionally engagable members for operably and conditionally interconnecting two of said planetary gear components in a manner such that the torque bias to the front and rear wheel drive output shafts is controlled by a torque level established between the frictionally engagable members of said clutch means by said ball ramp mechanism means.

2. The transfer case of claim 1 wherein said three components of said planetary gear arrangement include a sun gear, a ring gear, and a plurality of pinion gears intermeshing with said sun gear and said ring gear.

3. The transfer case of claim 2 wherein said sun gear is operably connected to said front wheel drive output shaft.

4. The transfer case of claim 2 wherein said ring gear is operably connected to said transmission output shaft.

5. The transfer case of claim 2 further including a planetary gear carrier having said pinion gears mounted thereon, said carrier being operably connected to said rear wheel drive output shaft.

6. The transfer case of claim 1 wherein the frictionally engagable members of said clutch means are respectively associated with said gear and said planetary gear carrier.

7. A transfer case for a four wheel drive vehicle, comprising:
   a planetary gear arrangement connectable to an output shaft of a transmission, said gear arrangement including at least three nested gear components for operably interconnecting said output shaft with both a front and a rear wheel drive output shaft such that input torque to the transfer case is normally biased to both output shafts in a predetermined ratio; and
   electromagnetically actuatable friction clutch means for operably and conditionally interconnecting two of said planetary gear components, said friction clutch means including the combination of a friction clutch and a ball ramp mechanism, the friction clutch having frictionally engageable interleaved elements associated at least one with each of said front and rear drive output shafts, the ball ramp mechanism having first and second relatively movable members with opposed ball ramps, with one member being operably connected to one of the drive output shafts and the other member being arranged proximate to said friction clutch and loosely mounted relative to said other member through freely turnable spherical elements positioned between said ball ramps, and electromagnetic means associated with said ball ramp mechanism for selectively moving the loosely mounted member toward the friction clutch to exert a compressive force against the frictionally engagable interleaved elements whereby relative rotation between the drive output shafts is controlled by a torque level established by the compressive force exerted on the friction clutch.

8. The transfer case of claim 7 wherein the loosely mounted member is formed of a magnetic material and the electromagnetic means includes a coil supported in said housing and operable during flow of an energizing clutch current therethrough to establish a magnetic field into which said loosely mounted member extends.

9. The transfer case of claim 7 further including mechanical means for urging said loosely mounted member in a direction away from the frictionally engaged members of said friction clutch.

10. The transfer case of claim 7 further including a third member rotatable with the other drive output shaft and disposed intermediate said loosely mounted member and the friction clutch.

11. The transfer case of claim 7 wherein the ball ramp mechanism is designed to prevent self-locking of the friction clutch.

12. An automotive transfer case having one rotary input shaft and two rotary output shafts, said transfer case comprising:
   a housing;
   a planetary gear set having at least three elements arranged within said housing, said three elements including a sun gear element operably connectable with one of said output shafts, a ring gear element operably connectable with said input shaft, and a pinion gear element assembly intermeshing with both the sun gear and ring gear elements and which is operably connectable with the other output shafts such that input torque to the transfer case is normally biased to the two output shafts in a predetermined ratio for full-time drive to both output shafts;
   electronically responsive biasing clutch means with ball ramp mechanism means operative to conditionally interconnect two of the planetary gear elements in a manner whereby biasing torque between the other two shafts through said clutch means.

13. An automotive transfer case having one rotary input shaft and two rotary output shafts, said transfer case comprising:
   a housing;
   a planetary gear set having at least three elements arranged within said housing, said three elements including a sun gear element connectable with one of said shafts, a ring gear element connectable with a second of said shafts, and a pinion gear element assembly intermeshing with both the sun and ring gear elements and which is operably connectable with the third shaft such that input torque to the transfer case is normally biased to both output shafts in a predetermined ratio; and
   electronically responsive biasing clutch means operative to selectively interconnect two of the planetary gear elements in a manner whereby biasing torque between the other two shafts through said clutch means and wherein said biasing clutch means comprises an electromagnetic clutch having a stationary magnetic coil disposed within said housing with the operative effect of said clutch means being modulatable as a function of the energized state of said magnetic coil.

14. The invention according to claim 13 wherein said sun gear is operably connected to one of said rotary output shaft.

15. The invention according to claim 14 wherein said pinion gear assembly is operably connected to the other rotary output shaft.

16. An automotive transfer case having one rotary input shaft and two rotary output shafts, said transfer case comprising:
   a housing;
   a planetary gear set having at least three elements arranged within said housing said three elements including a sun gear element connectable with one of said output shafts, a ring gear element connectable with said input shaft, and a pinion gear element assembly intermeshing with both the sun and ring gear elements and which is operably connectable with the other output shaft such that input torque to the transfer case is normally biased to both output shafts in a predetermined ratio; and
   electronically responsive biasing clutch means operative to selectively interconnect two of the planetary gear elements in a manner whereby biasing torque between the two output shafts through said clutch means and wherein the biasing clutch means is comprised of a friction clutch having interleaved friction plates wherein one or more of said friction plates rotate with one rotary output shaft and the remaining friction plates rotate with the other output shaft, a ball ramp mechanism including first and second relatively movable members with opposed ball ramps, with one of the members being operably connected to one of said rotary output shafts and the other member being loosely mounted relative to said one member through ball members located between said ball ramps, and a third member operably connected to said other output shaft, electromagnetic means associated with said ball ramp mechanism for coupling the loosely mounted member to said third members as an operable assembly and moving said operable assembly toward said friction clutch to exert a compressive force thereon whereby relative rotation between the output shafts is restricted by a torque level established by the compressive force exerted on the clutch.

17. The invention of claim 16 wherein said loosely mounted member is formed of a magnetic material and the electromagnetic means includes coil means supported in said housing and responsive to an energizing clutch current therethrough to establish a magnetic field into which said loosely mounted member extends.

18. The invention according to claim 18 wherein the compressive force exerted on the friction clutch is a function of a predetermined energizing clutch current being delivered to said coil means.

19. The invention according to claim 16 further including mechanical means for exerting a force against said loosely mounted member such that said loosely mounted member exerts substantially no compressive force on said friction clutch when said electromagnetic means is deenergized.

20. The invention according to claim 16 wherein said third member is disposed intermediate said loosely mounted member and the friction clutch.

21. The invention according to claim 16 wherein the ball ramp mechanism is designed to prevent self locking of the friction clutch.

22. Apparatus for use on a vehicle said apparatus including an input shaft and first and second output shafts, said apparatus being operable to continuously provide driving torque to all four wheels of said vehicle, said apparatus comprising:
    a housing;
    first operative means disposed in said housing for transfering input torque to said apparatus to both of said output shafts in a manner such that rotation of said input shaft normally drives the other shafts in a predetermined ratio and wherein said first operative means comprises three nested relatively rotatable elements including a sun gear operably connected to one of said output shafts, a ring gear operably driven by the input shaft, and intermeshing pinion gears operably connected to the other of said output shafts; and
    modulatable biasing clutch means defining a second operative means operably interposed between any two of said relatively rotatable elements of said first operative means for transferring torque and controlling relative rotation between said output shafts by a torque level established through energization of said clutch.

23. Apparatus for use on a vehicle, said apparatus including an input shaft and first and second output shafts, said apparatus being operable to provide driving torque to all four wheels of said vehicle, said apparatus comprising:
    a housing;
    operative means disposed in said housing for transferring input torque to both of said shafts in a manner such that rotation of said input shaft normally drives the other shafts in a predetermined ratio and wherein said operative means comprises three nested relatively rotatable elements including a sun gear operably connectable to one of said output shafts, a ring gear operably driven by the main drive shaft, and intermeshing pinion gears operably connectable to the other of said output shafts; and
    modulatable biasing clutch means operably interposed between any two of said relatively rotatable elements of said operative means for transferring torque and controlling relative rotation between said output shafts by a torque level established through energization of said clutch, said biasing clutch means comprises the combination of a friction clutch, a ball ramp mechanism, and electromagnetic means associated with said ball ramp mechanism for selectively energizing said friction clutch.

24. The apparatus of claim 23 wherein said friction clutch includes frictionally engageable interleaved elements at least one of which is operatively associated with one output shaft and other of which is operatively associated with the other output shaft.

25. The apparatus of claim 24 wherein the ball ramp mechanism comprises a free turning disc coaxially arranged relative one of said output shafts and having a first surface portion, a second surface portion arranged for rotation in timed relation relative said one of said output shafts, said surface portions facing each other and each being formed with at least one wedge-shaped recess, said recesses being in substantial alignment with each other, and a spherical ball element freely rotatable in the space between said recesses.

26. The apparatus of claim 25 wherein upon energization said electromagnetic means cooperates with said ball ramp mechanism to selectively move the freely mounted disc toward the friction clutch to exert a compressive force against the engageable interleaved elements whereby relative rotation between said first and second output shafts is controlled by a torque level established by the compressive force exerted on the friction clutch.

27. The apparatus of claim 25 wherein the free turning disc is formed of a magnetic material and the electromagnetic means includes a coil supported in said housing and operable during flow of an energizing clutch current therethrough to establish a magnetic field into which said disc extends.

28. The apparatus of claim 27 wherein the compressive force exerted on the friction clutch is a function of a predetermined energizing clutch current being delivered to said coil.

29. The apparatus of claim 26 further including positioning means for exerting a force against said free turning disc such that said disc is positioned to exert substantially no compressive force on said fuction clutch when said electromagnetic means is deenergized.

30. The apparatus of claim 24 wherein the ball ramp mechanism is designed to prevent self locking of the friction clutch.

31. The apparatus of claim 25 further including a second disc coaxially arranged relative said free turning disc and adopted for rotation with the other output shaft, said second disc being arranged intermediate said free turning disc and the friction clutch.

32. A transfer case for a full-time four wheel drive vehicle which is driven by a power source comprising:
a housing;
a planetary gear assembly mounted in said housing for normally transfering torque derived from said power source to each of said four wheels, said planetary gear assembly including an externally toothed sun gear rotatable about an axis of rotation thereof and operably connected to a first output drive shaft, an internally toothed ring gear rotatable about an axis of rotation substantially coaxial with the axis of rotation of said sun gear and operably connected to an input drive shaft, and a plurality of planet pinions carried by a pinion carrier which turns about the axis of rotation of the sun gear with which is operably connected to a second output drive shaft, said planet pinions meshing with the sun gear and ring gear such that rotation of any one shaft effects rotation of the others; and
frictional coupling means having first and second friction element means respectively mounted for rotation with said first and second rotary output shaft and electromagnetically actuated means for modulating the frictional engagement between said first and second friction discs in a manner controlling the transfer of torque and the relative rotational speed between said first and second rotary power output shafts.

* * * * *